(12) United States Patent
Ruckes et al.

(10) Patent No.: US 8,903,569 B2
(45) Date of Patent: Dec. 2, 2014

(54) METHOD FOR CONTROLLING A HIGH-LIFT DEVICE OR A FLIGHT CONTROL SURFACE, SYSTEM AND AIRCRAFT OR SPACECRAFT

(71) Applicants: Airbus Operations GmbH, Hamburg (DE); Airbus Operations (S.A.S.), Toulouse (FR)

(72) Inventors: Ina Ruckes, Bremen (DE); Marc Fervel, Toulouse (FR); Tobias Sebastian Rumpf, Bremen (DE)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 8 days.

(21) Appl. No.: 13/707,033

(22) Filed: Dec. 6, 2012

(65) Prior Publication Data

US 2013/0166111 A1    Jun. 27, 2013

Related U.S. Application Data

(60) Provisional application No. 61/569,495, filed on Dec. 12, 2011.

(30) Foreign Application Priority Data

Dec. 12, 2011  (EP) .................................... 11193054

(51) Int. Cl.
    *B64C 19/00*    (2006.01)
    *B64G 1/24*    (2006.01)
(52) U.S. Cl.
    CPC . *B64C 19/00* (2013.01); *B64G 1/24* (2013.01); *Y02T 50/44* (2013.01)
    USPC .............. 701/3; 244/99.5; 244/175; 244/203; 244/10; 244/213; 244/214; 701/4

(58) Field of Classification Search
    CPC ....................................................... B64C 19/00
    USPC .......... 701/3, 4; 244/175, 214, 201, 215, 213, 244/99.5, 203
    See application file for complete search history.

(56) References Cited

U.S. PATENT DOCUMENTS 7,059,563 B2 *  6/2006  Huynh ......................... 244/99.5
7,366,592 B2 *  4/2008  Delaplace et al. ................. 701/4

(Continued)

FOREIGN PATENT DOCUMENTS

| DE | 10 2009 022 602 | 12/2010 |
| FR | 2927308 | 8/2009 |
| WO | WO 2010/103234 | 9/2010 |

OTHER PUBLICATIONS

European Search Report for Application No. 11193054.1-2422 dated May 4, 2012.

*Primary Examiner* — Thomas G Black
*Assistant Examiner* — Wae Louie
(74) *Attorney, Agent, or Firm* — Jenkins, Wilson, Taylor & Hunt, P.A.

(57) ABSTRACT

The present invention discloses a method for controlling a high-lift device or a flight control surface of an aircraft or spacecraft, especially with a system according to the present invention, comprising the steps of receiving, at least one first control unit, a command signal from a commander unit via a data network, providing a primary control signal to at least one secondary control unit via the data network, wherein the primary control signal depends on the received command signal, receiving, at the at least one second control unit, a sensor signal of one or more sensors of the high-lift device or flight control surface, and providing a secondary control signal to one or more actuators of the high-lift device or flight control surface, wherein the secondary control signal depends on the received sensor signal. Furthermore, the present invention discloses a system and an aircraft or spacecraft.

12 Claims, 3 Drawing Sheets

(56) References Cited

U.S. PATENT DOCUMENTS

| | | | |
|---|---|---|---|
| 7,556,224 B2* | 7/2009 | Johnson et al. | 244/175 |
| 2010/0001678 A1* | 1/2010 | Potter et al. | 318/569 |
| 2011/0118906 A1* | 5/2011 | Fervel et al. | 701/3 |
| 2012/0097801 A1* | 4/2012 | Barrett | 244/7 A |
| 2012/0109424 A1* | 5/2012 | Fervel et al. | 701/3 |
| 2012/0138751 A1* | 6/2012 | Richter et al. | 244/214 |
| 2013/0166111 A1* | 6/2013 | Ruckes et al. | 701/3 |

* cited by examiner

METHOD FOR CONTROLLING A HIGH-LIFT DEVICE OR A FLIGHT CONTROL SURFACE, SYSTEM AND AIRCRAFT OR SPACECRAFT

CROSS-REFERENCE TO RELATED APPLICATIONS

This application claims the benefit of and priority to U.S. Provisional Application No. 61/569,495, filed Dec. 12, 2011 and European Patent Application No. 11193054.1 filed Dec. 12, 2011, the entire disclosures of which are herein incorporated by reference.

FIELD OF THE INVENTION

The present invention relates to a method for controlling a high-lift device or a flight control surface of an aircraft or spacecraft. Furthermore, the present invention relates to a system for controlling a high-lift device or a flight control surface of an aircraft or spacecraft and an aircraft or spacecraft.

BACKGROUND

Although applicable to any aircraft systems, the present invention and the problem underlying the present invention will be described relating to a system for controlling a high-lift device or a flight control surface of an aircraft.

In the design of modern aircraft aircraft designers have to consider different flight situations and conditions when designing an aircraft.

In general aircraft designers need to find a compromise to maximise the performance of an aircraft for a particular situation, like for example for starting and landing or for cruising.

Here, one fundamental design constraint is the size of the wing of an aircraft. A large wing will provide more lift and reduce takeoff and landing distance, however, at the same time will increase drag during cruising flight and thereby lead to lower than optimum fuel economy.

To achieve a reduced takeoff and landing distance and better fuel economy during cruising flight, high-lift devices comprising e.g. flaps and slats can be used. Such high-lift systems provide larger wing surfaces during takeoff and landing and economic wing sizes during cruising flights.

During takeoff and landing the high-lift device or a flight control surface are extracted from the wing and thus increase the surface of the wing. Once the cruising altitude is reached the high-lift device or the flight control surface are retracted into the wing reducing the surface of the wing.

The system for controlling a high-lift device or a flight control surface of an aircraft uses sensors and control units to command the high-lift actuation system into a determined position. Further, the system for controlling a high-lift device or a flight control surface monitors the actuation system of the slats and flaps for faults and reacts upon the detection thereof.

The document WO 2010103234 discloses local control units for a flight control system. This architecture considers local control units for the high-lift system located close to the central drive actuator of the high-lift system and in the wing of the aircraft. System monitoring is located at primary control units of the system. Therefore, data transmission of sensor data and control loop feedback has a certain delay.

SUMMARY

Consequently, the problem underlying the present invention is to provide means to effectively control a high-lift device or a flight control surface.

This problem is solved by a method for controlling a high-lift device or a flight control surface according to claim 1, a system according to claim 4 and an aircraft or spacecraft according to claim 12.

Accordingly, the present invention provides:

A method for controlling a high-lift device or a flight control surface of an aircraft or spacecraft comprising the steps of receiving, at least one first control unit, a command signal from a commander unit via a data network, providing a primary control signal to at least one secondary control unit via the data network, wherein the primary control signal depends on the received command signal, receiving, at the at least one second control unit, a sensor signal of one or more sensors of the high-lift device or flight control surface, and providing a secondary control signal to one or more actuators of the high-lift device or flight control surface, wherein the secondary control signal depends on the received sensor signal and the primary control signal.

A system for controlling a high-lift device or a flight control surface of an aircraft or spacecraft, especially for performing a method according to the present invention, comprising a commander unit, at least one primary control unit, at least one secondary control unit separated from the at least one primary control unit, a data network connecting the at least one primary control unit with the commander unit and with the at least one secondary control unit, and at least one control loop connecting the at least one secondary control unit with one or more actuators of the high-lift device or flight control surface and with one or more sensors of the high-lift device or flight control surface, wherein the at least one primary control unit is configured to receive a command signal from the commander unit via the data network and to provide a primary control signal to the at least one secondary control unit via the data network, wherein the primary control signal depends on the command signal, and wherein the at least one secondary control unit is configured to receive a sensor signal from one or more sensors of the high-lift device or flight control surface via the at least one control loop and to provide a secondary control signal to one or more actuators of the high-lift device or flight control surface via the at least one control loop, wherein the secondary control signal depends on the sensor signal and the primary control signal.

An aircraft or spacecraft, comprising at least one system for controlling a high-lift device or a flight control surface according to the present invention.

The present invention is further based on the perception that abundant resources are available in modern aircrafts, which could be used for controlling aircraft functions.

The present invention is based on two main ideas. The first idea relates to the usage of common resources and shared networks wherever reasonable. The second idea involves splitting the functionality of the system in two separate groups. A first function group involves generating primary control signals, wherein the primary control signals represent physical parameters that are not directly coupled to the control of actuators, like e.g. a flaps angle or a heading angle for the aircraft. Such primary control signal are for example used in aircraft level functions, like e.g. the high-lift function. The second function group involves direct control of actuators through secondary control signals, wherein the secondary control signals can comprise physical parameters that are directly coupled to the control of actuators, for example a current or voltage applied to an electrical motor. The invention furthermore includes the allocation of these function groups at appropriate control units.

The present invention uses primary control units for the generation of the primary control signals and secondary control units for the generation of the secondary control signals. Both, the primary and the secondary control units, are connected via a data network to transmit application data.

The present system furthermore can be coupled to actuators and sensors that are used to control the high-lift device or a flight control surface systems. The actuators directly control high-lift devices or flight control surfaces on an aircraft wing and the sensors are used to monitor the movement of the high-lift devices or flight control surfaces and provide position data of the high-lift devices or flight control surfaces to the control units.

Further embodiments of the present invention are disclosed in the subclaims.

According to a possible embodiment providing a secondary control signal comprises providing at least one of the secondary control units in one actuator and/or one sensor, the actuator and/or sensor being directly connected to the primary control unit via a data network or being indirectly connected to the primary control unit via at least one router and/or switch in the data network.

According to another possible embodiment data is transmitted between the secondary control unit and the at least one actuator and/or the at least one sensor directly via the data network or via at least one router and/or switch in the data network.

According to a possible embodiment the at least one secondary control unit comprises discrete and/or analogue actuator interfaces to directly control the at least one actuator. This allows creating compact control loops and fast control of actuators.

According to another possible embodiment the at least one secondary control unit comprises discrete and/or analogue sensor interfaces to acquire sensor data from the at least one sensor. This also allows creating compact control loops and direct responses to changes in sensor readings.

According to another possible embodiment at least one of the secondary control units is part of one actuator and/or one sensor, the actuator and/or sensor being directly connected to the primary control unit via the data network or being indirectly connected to the primary control unit via at least one router and/or switch in the data network. This feature makes it possible to make use of unused resources of the hardware of the actuators and/or sensors and include control functions and network communication functions in the actuators and/or sensors. The existing hardware can be used to full capacity and no separate secondary control units will be necessary. In such an embodiment the exact configuration of the secondary control unit varies depending on the type of actuator and/or sensor comprising the secondary control unit.

According to another possible embodiment the at least one actuator and the at least one sensor each comprise a network interface, and the at least one actuator and the at least one sensor are directly connected to the at least one secondary control unit via the data network, or the at least one actuator and the at least one sensor are connected to the at least one secondary control unit via at least one router and/or switch in the data network. This allows to implement very flexible network architectures and to adapt the network architecture to the need of different applications.

According to a further embodiment the at least one actuator and the at least one sensor each comprise a network interface and are directly or indirectly coupled to the primary control unit via the network. By omitting the secondary control unit the complexity of the system can be reduced if the network provides the necessary latencies between the actuators and/or sensors and the primary control unit.

According to another possible embodiment the at least one primary control unit is embedded in a core processing module and/or an IMA control unit. IMA control units provide a standardised architecture to achieve reductions in size, cost and weight by providing a standardised set of flexible hardware and software resources. These resources can be statically or dynamically mapped to a set of required avionics functional capabilities. The core processing module is the common avionics computer resource supporting most of the software implemented functions of the aircraft. The core processing module is a standard hardware platform designed to host several independent aircraft functions. The ARINC 653 Standard specifies the software avionics partitioning constraints to the underlying Real-time operating system (RTOS), and the associated API. Furthermore, AFDX, MicroAFDX or other high-bandwidth digital data buses are specified as a the data network bus for IMA control units.

By using standardised core processing modules or IMA control units new functions can easily be integrated into the control system.

According to another possible embodiment the at least one secondary control unit is embedded in a remote processing module and/or an IMA control unit. Furthermore, in one possible embodiment the remote processing module and/or IMA control unit in which the secondary control unit is embedded is different than the core processing module and/or IMA control unit in which the primary control unit is embedded.

According to another possible embodiment the system is composed of a redundant architecture comprising at least two data networks and/or at least two primary control units and/or at least two secondary control units and/or redundant actuators and sensors. In such a case the at least two data networks and/or at least two primary control units and/or at least two secondary control units and/or redundant actuators and sensors can be of the same type or of different types. By providing a redundant architecture the system can be used in variety of sensible areas because safety of the system is greatly improved.

According to another possible embodiment the redundant architecture comprises two parallel independent data networks each with a primary control unit, a secondary control unit and the corresponding actuators and sensors. If every component in the system is duplicated a very robust system can be provided.

In another embodiment of the present invention an aircraft or spacecraft comprises one system according to the present invention, wherein the system is used to control the flaps and the slats.

In another possible embodiment an aircraft or spacecraft comprises at least two systems according to the present invention. One system for the flaps and one system for the slats of a high-lift device of the aircraft.

In another embodiment an aircraft or spacecraft comprises two redundant systems according to the present invention. One redundant system controlling the flaps and one redundant system controlling the slats of a high-lift device of the aircraft.

Further features of the present invention will be apparent from the following specification and claims when considered in connection with the accompanying drawings, in which like elements are labelled using like reference numerals in the various figures.

DETAILED DESCRIPTION

Figure 1:
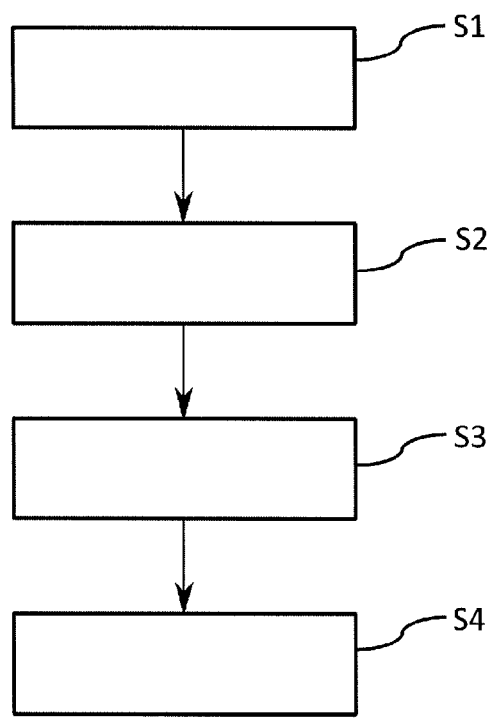
FIG. 1 is a flow diagram of an exemplary embodiment of a method according to the present invention.

FIG. 1 shows a flow diagram of an exemplary embodiment of a method according to the present invention.

In a first step S1 a command signal from a commander unit is received via a data network at least one first control unit. In a second step S2 a primary control signal is provided to at least one secondary control unit via the data network, wherein the primary control signal depends on the received command signal. In a third step S3 at the at least one second control unit, a sensor signal is received of one or more sensors of the high-lift device or flight control surface. Finally in a fourth step a secondary control signal is provided to one or more actuators of the high-lift device or flight control surface, wherein the secondary control signal depends on the received sensor signal and the primary control command.

Figure 2:
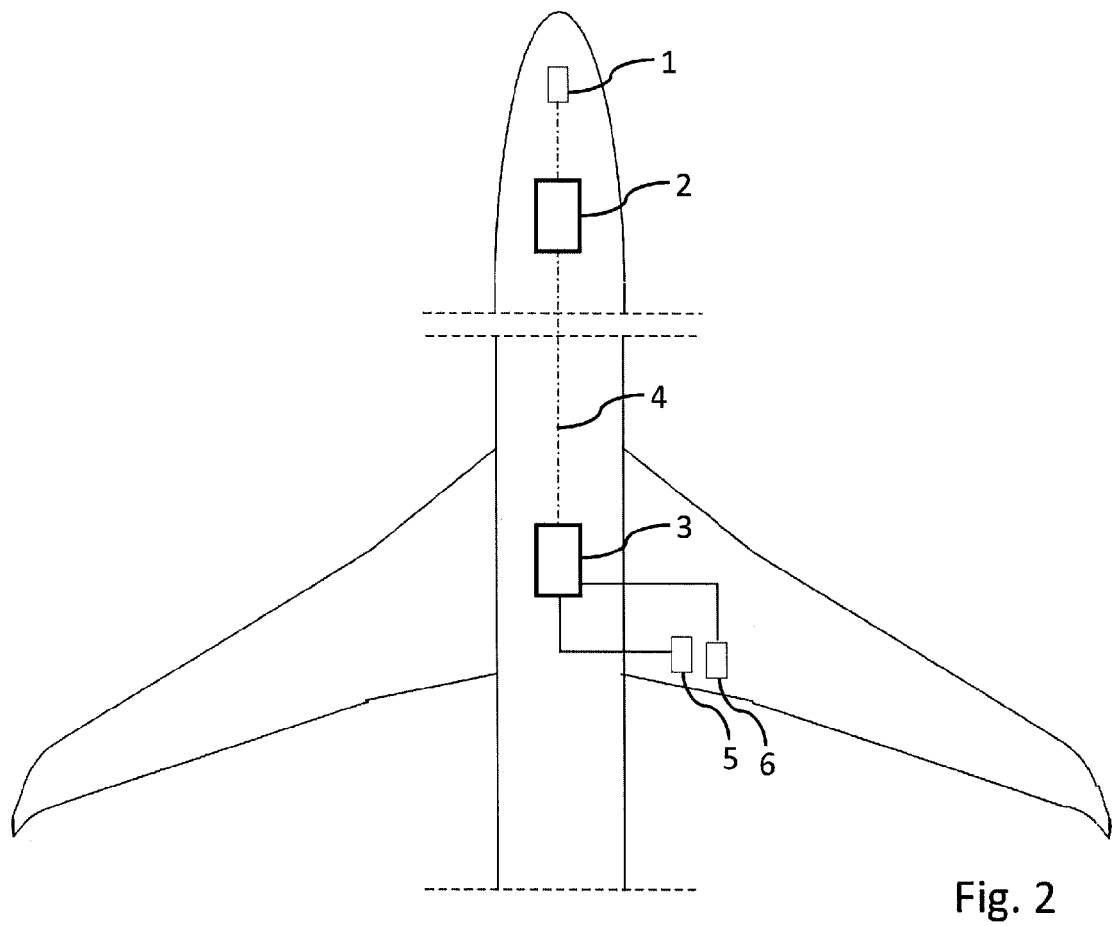
FIG. 2 is a block diagram of an exemplary embodiment of the system according to the present invention.

FIG. 2 shows a block diagram of an exemplary embodiment of the system according to the present invention.

The system of FIG. 2 comprises a commander unit 1 which is connected to a primary control unit 2 by data network 4. The primary control unit 2 is connected by data network 4 to a secondary control unit 3. Finally, secondary control unit 3 is connected through discrete and/or analogue connections to an actuator 5 and a sensor 6.

In FIG. 2 the commander unit 1 is embodied as a flaps lever device 1. In other embodiments the commander unit 1 of FIG. 2 may be embodied as another manual input device 1, a program controlled device 1, e.g. an autopilot device of an aircraft, or a computer program module, that is executed by a flight system installed in an aircraft.

In FIG. 2 the data network 4 is illustrated by a row of dots and dashes. The discrete and/or analogue connections are illustrated as solid lines.

The system of FIG. 2 is embedded in an airplane 10.

The flaps lever device 1 in FIG. 2 comprises a network interface unit to directly connect the flaps lever device 1 to the data network 4. In further embodiments the flaps lever device 1 comprises an analogue output interface and a network adapter device is coupled between the flaps lever device 1 and the data network 4. The network adapter device being configured to convert the analogue signals into network data packets for transmission on data network 4.

An Integrated Modular Avionics (IMA) unit comprises the primary control unit 2 in FIG. 2. IMA units represent airborne real-time computer network systems. IMA units implement an integrated architecture, which allows applications to be easily ported between different IMA units.

In a possible embodiment another IMA unit comprises the secondary control unit 3.

In further embodiments an embedded system, a standard control computer or the like comprises the primary control unit 2.

The actuator 5 in FIG. 2 comprises a wing tip brake and the sensor 6 comprises an asymmetry position pick-off unit and any further position or speed measurement sensor.

Figure 3:
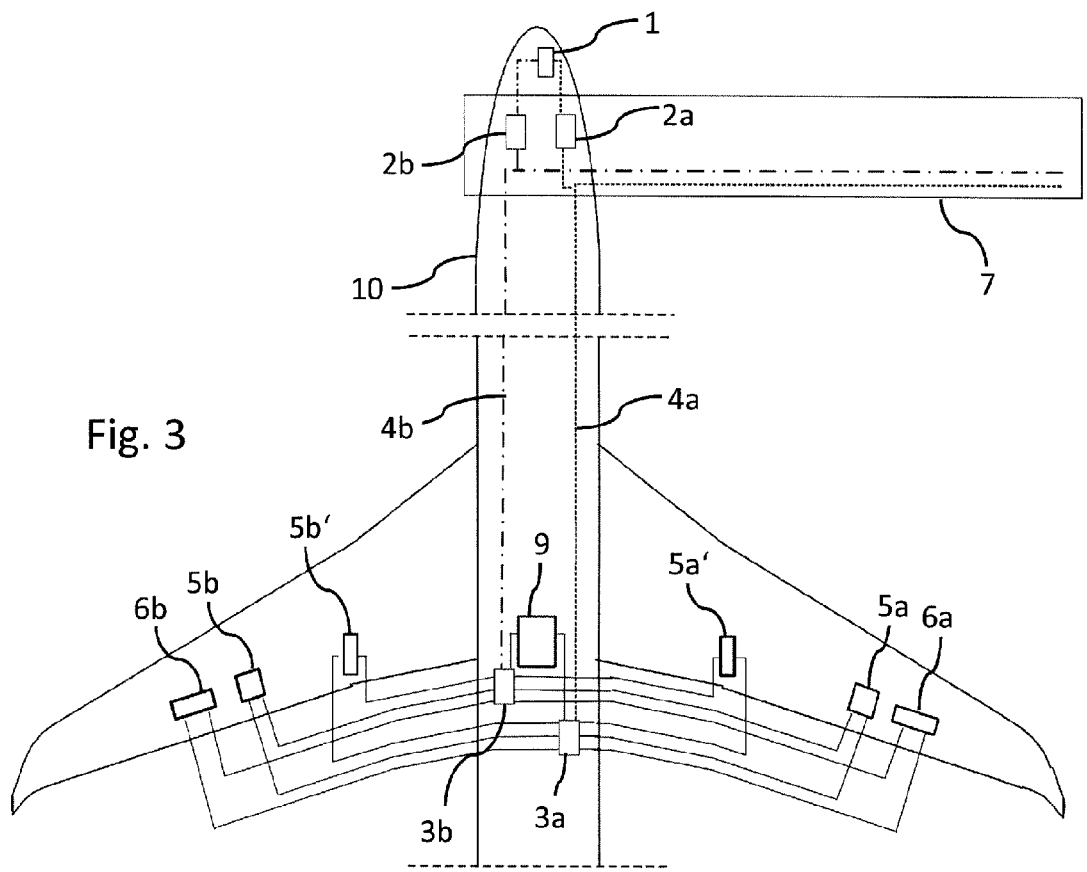
FIG. 3 is another block diagram of an exemplary embodiment of the system according to the present invention.

FIG. 3 shows another block diagram of an exemplary embodiment of the system according to the present invention.

The system of FIG. 3 in contrast to the system of FIG. 2 comprises two separate data networks 4a and 4b. The connections of the first data network 4a are illustrated as dotted lines and the connections of the second data network 4b are illustrated as lines of dots and dashes. Each of the data networks 4a, 4b comprises a primary control unit 2a, 2b and a secondary control unit 3a, 3b. Actuators 5a, 5a', 5b, 5b' and sensors 6a, 6b comprise two discrete and/or analogue interfaces each and are connected via discrete and/or analogue lines to each of the secondary control units 3a, 3b.

The system of FIG. 3 comprises two actuators 5a, 5a' and 5b, 5b' on every wing. Furthermore, the system comprises one sensor 6a and 6b on every wing.

Connected to both secondary control units 3a, 3b the system of FIG. 3 also comprises a power control unit 9 configured to power the high-lift device or flight control surface actuators 5a, 5a', 5b, 5b'.

The flaps lever device in FIG. 3 comprises at least two network interfaces and is coupled to both data networks 4a, 4b.

In FIG. 3 the primary control units 2a, 2b are also configured as IMA units 2a, 2b. The IMA units 2a, 2b are installed in an IMA cabinet 7. The IMA cabinet 7 offers installation bays for a plurality of IMA units 2a, 2b and provides data network 4a, 4b access for the plurality of IMA units 2a, 2b to both data networks 4a, 4b.

The system comprises a functionality split-up between the IMA units 2a, 2b located in the IMA cabinet 7 and the secondary control units 3a, 3b located adjacent the power control unit 9. The IMA units 2a, 2b are used to calculate the primary control signals for the system such as position commands, automatic functions, system health monitoring and the like. The secondary control units 3a, 3b host all hardware dependant functionality including motor control, failure monitoring such as rod rupture or system jam and the like.

The data networks 4a, 4b connecting the IMA units 2a, 2b with the respective secondary control units 3a, 3b both comprise for example AFDX networks or the like.

In a further embodiment the data networks 4a, 4b comprise different data networks 4a, 4b. For example one data network 4a, 4b could comprise an AFDX network 4a, 4b and the other data network 4b, 4a could comprise an EREBUS network 4b, 4a.

In a further embodiment each data networks 4a, 4b comprise at least two different data networks to form a redundant data network 4a, 4b. For example a data network 4a, 4b could comprise an AFDX network and an EREBUS network.

In an embodiment of the system the data networks 4a, 4b are also used by other applications. This allows reducing the amount of wiring necessary to implement all functions needed in an aircraft.

In another embodiment of the system each of the primary control units 2a, 2b and each of the secondary control units 3a, 3b comprises different hardware and software possibly independently developed. By doing so, a systematic error in one control unit will not lead to a system malfunction of the redundant system of FIG. 3.

The embodiment of a system shown in FIG. 3 provides fail safe redundant operation of the high-lift device or flight control surface of an aircraft 10. If any node on one of the data networks 4a, 4b fails full operation of the data transmission is guaranteed by the other data network 4b, 4a. Therefore, the aircraft 10 could still be safely operated with one defective data network 4a, 4b.

Figure 4:
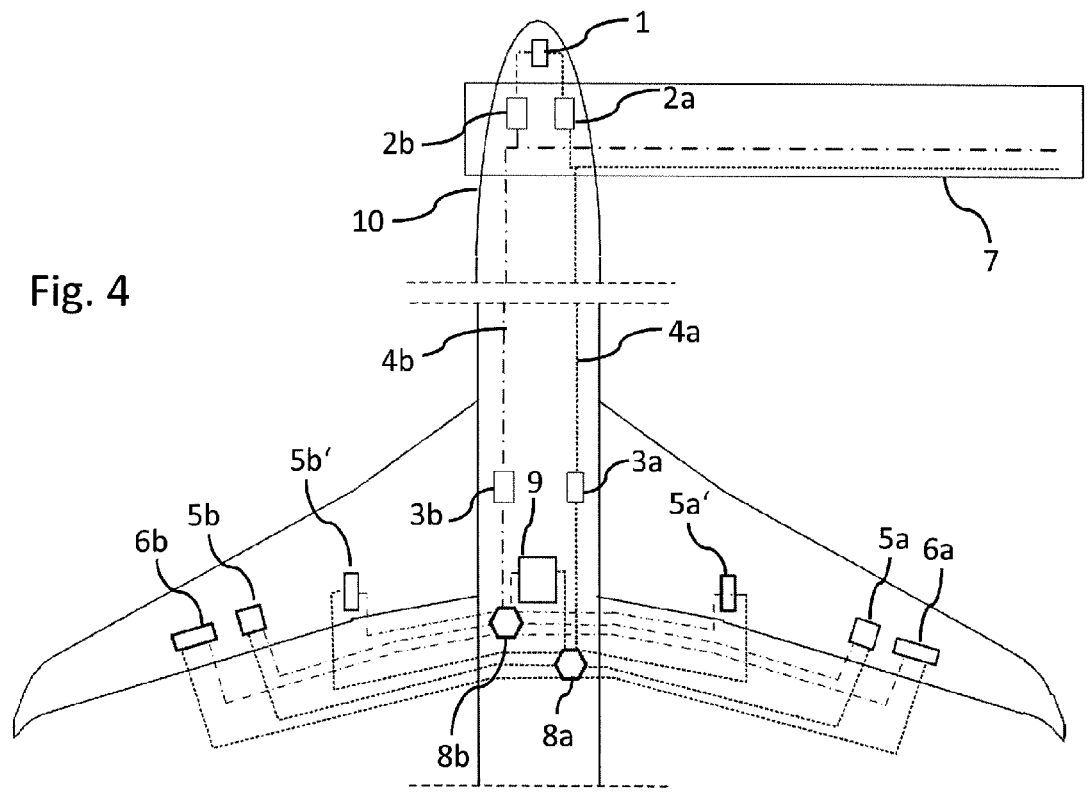
FIG. 4 is another block diagram of an exemplary embodiment of the system according to the present invention.

FIG. 4 shows another block diagram of an exemplary embodiment of the system according to the present invention.

The system of FIG. 4 only differs from the system in FIG. 2 in that the actuators 5a, 5a', 5b, 5b' and the sensors 6a, 6b each comprise two network interfaces for connection to the data networks 4a, 4b each.

In one embodiment the actuators 5a, 5a', 5b, 5b' and the sensors 6a, 6b are connected to the secondary control units 3a, 3b via µAFDX networks and p-Star network switches 8a, 8b. In another embodiment one of the data network 4a, 4b comprises an EREBUS back-up data network 4a, 4b in addition to the primary network.

In contrast to the system of FIG. 3 the system of FIG. 4 does not reduce wiring and system complexity. But the system of FIG. 4 provides electrical monitoring directly at the component level, which increases the independency of the control units from the component implementation and requires the component supplier rather than the control unit supplier to implement the monitoring algorithm. Furthermore, automated configuration or calibration could be provided by the components thus reducing the required effort during system integration and maintenance of the system.

Figure 5:
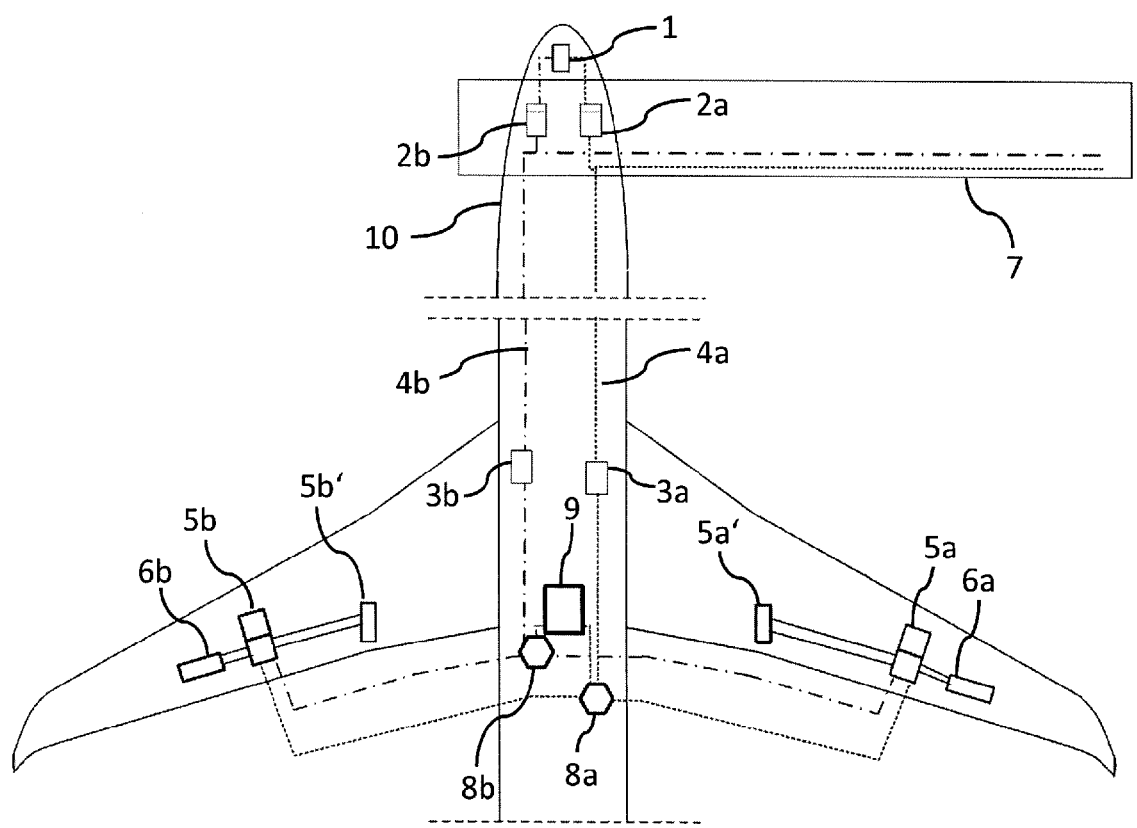
FIG. 5 is another block diagram of an exemplary embodiment of the system according to the present invention.

FIG. 5 shows another block diagram of an exemplary embodiment of the system according to the present invention.

The system of FIG. 5 comprises a combination of the systems of FIGS. 3 and 4. In contrast to the system of FIG. 4 only two of the actuators 5a, 5b comprise network interfaces to directly connect to the data networks 4a, 4b. In addition, both the actuators 5a, 5b comprise discrete and/or analogue interfaces to connect to actuators 5a' and 5b' and sensors 6a and 6b.

In FIG. 5 the functionality is split up between the primary control units 2a, 2b located in the IMA cabinet 7 and local control units of the actuators 5a and 5b. These local control units comprise the generation of the secondary control signals for the actuators and local monitoring functions like rod rupture monitoring and the like. The secondary control units 3a and 3b in FIG. 5 comprise monitoring functions like jam monitoring, uncommanded movement monitoring and the like.

In one embodiment the data networks 4a, 4b are configured to provide low latency. In this embodiment the secondary control units 3a, 3b can be removed from the system and the control functions previously embodied in the secondary control units 3a, 3b can be executed by the primary control units 2a, 2b.

The architecture of the system according to FIG. 5 reduces the cost of the system as standardized control units are used for the high-lift device or flight control surface system. This reduces the number of part numbers in an aircraft, reduces the development cost and reduces the cost per unit of the system components. This embodiment further reduces the weight of the aircraft due to the sharing of network resources.

The benefits and advantages that may be provided by the present invention have been described above with regard to specific embodiments. These benefits and advantages, and any elements or limitations that may cause them to occur or to become more pronounced are not to be construed as critical, required or essential features of any or all of the claims.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as details within the following claims.

REFERENCES 1 commander unit
2, 2a, 2b primary control unit
3, 3a, 3b secondary control unit
4, 4a, 4b data network
5, 5a, 5b, 5a', 5b' actuator
6, 6a, 6b sensor
7 IMA Cabinet
8, 8a, 8b router or switch
9 power control unit

The invention claimed is:

1. A method for controlling a high-lift device or a flight control surface of an aircraft or spacecraft, the method comprising:
   connecting a commander unit and at least one first control unit to a data network;
   connecting at least one secondary control unit to the data network;
   receiving, at the at least one first control unit, a command signal from the commander unit via the data network;
   providing a primary control signal to the at least one secondary control unit via the data network, wherein the primary control signal is provided by the at least one first control unit and depends on the received command signal, and wherein the primary control signal represents physical parameters that are not directly coupled to the control of one or more actuators of the high-lift device or the flight control surface;
   receiving, at the at least one second control unit, a sensor signal of one or more sensors of the high-lift device or the flight control surface; and
   providing a secondary control signal to the one or more actuators of the high-lift device or the flight control surface, wherein the secondary control signal is provided by the at least one secondary control unit and depends on the received sensor signal and the primary control signal, and wherein the secondary control signal comprises physical parameters that are directly coupled to the control of the one or more actuators.

2. The method according to claim 1, wherein providing the secondary control signal comprises providing at least one of the secondary control units in one actuator and/or one sensor, the actuator and/or sensor being directly connected to the primary control unit via the data network or being indirectly connected to the primary control unit via at least one router and/or switch in the data network.

3. The method according to claim 1, wherein data is transmitted between the secondary control unit and the one or more actuators and/or the one or more sensors directly via the data network or via at least one router and/or switch in the data network.

4. A system for controlling a high-lift device or a flight control surface of an aircraft or spacecraft, the system comprising:
   a commander unit;
   at least one primary control unit;
   at least one secondary control unit separated from the at least one primary control unit;
   a data network connecting the at least one primary control unit with the commander unit and with the at least one secondary control unit; and
   at least one control loop connecting the at least one secondary control unit with one or more actuators of the high-lift device or the flight control surface and with one or more sensors of the high-lift device or the flight control surface;

wherein the at least one primary control unit is configured to receive a command signal from the commander unit via the data network and to provide a primary control signal to the at least one secondary control unit via the data network, wherein the primary control signal depends on the command signal, and wherein the primary control signal represents physical parameters that are not directly coupled to control of the one or more actuators of the high-lift device or the flight control surface; and wherein the at least one secondary control unit is configured to receive a sensor signal from the one or more sensors of the high-lift device or the flight control surface via the at least one control loop and to provide a secondary control signal to the one or more actuators of the high-lift device or the flight control surface via the at least one control loop, wherein the secondary control signal depends on the sensor signal and the primary control signal, and wherein the secondary control signal comprises physical parameters that are directly coupled to the control of the one or more actuators.

5. The system of claim 4, wherein the at least one secondary control unit comprises discrete and/or analogue actuator interfaces to directly control the one or more actuators.

6. The system according to claim 4, wherein the at least one secondary control unit comprises discrete and/or analogue sensor interfaces to acquire sensor data from the one or more sensors.

7. The system according to claim 4, wherein at least one of the second control units is part of one actuator and/or one sensor, the actuator and/or sensor being directly connected to the primary control unit via the data network or being indirectly connected to the primary control unit via at least one router and/or switch in the data network.

8. The system according to claim 4, wherein the one or more actuators and the one or more sensors each comprise a network interface; and
wherein the one or more actuators and the one or more sensors are directly connected to the at least one secondary control unit via the data network; or
wherein the one or more actuators and the one or more sensors are connected to the at least one secondary control unit via at least one router and/or switch in the data network.

9. The system according to claim 4, wherein the at least one primary control unit is embedded in a core processing module and/or an IMA control unit; and/or wherein the at least one secondary control unit is embedded in a remote processing module and/or an IMA control unit.

10. The system according to claim 4, wherein the system is composed of a redundant architecture comprising at least two data networks and/or at least two primary control units and/or at least two secondary control units and/or redundant actuators and sensors.

11. The system according to claim 4, wherein the system is composed of a redundant architecture comprising two parallel independent data networks each with a primary control unit, a secondary control unit and corresponding actuators and sensors.

12. An aircraft or spacecraft comprising at least one system for controlling a high-lift device or a flight control surface, the system comprising:
a commander unit;
at least one primary control unit;
at least one secondary control unit separated from the at least one primary control unit; and
a data network connecting the at least one primary control unit with the commander unit and with the at least one secondary control unit; and
at least one control loop connecting the at least one secondary control unit with one or more actuators of the high-lift device or the flight control surface and with one or more sensors of the high-lift device or the flight control surface;
wherein the at least one primary control unit is configured to receive a command signal from the commander unit via the data network and to provide a primary control signal to the at least one secondary control unit via the data network, wherein the primary control signal depends on the command signal, and wherein the primary control signal represents physical parameters that are not directly coupled to control of the one or more actuators of the high-lift device or the flight control surface; and
wherein the at least one secondary control unit is configured to receive a sensor signal from the one or more sensors of the high-lift device or the flight control surface via the at least one control loop and to provide a secondary control signal to the one or more actuators of the high-lift device or the flight control surface via the at least one control loop, wherein the secondary control signal depends on the sensor signal and the primary control signal, and wherein the secondary control signal comprises physical parameters that are directly coupled to the control of the one or more actuators.

* * * * *